(12) United States Patent
Serizawa et al.

(10) Patent No.: US 8,711,195 B2
(45) Date of Patent: Apr. 29, 2014

(54) OPTICAL WRITER AND IMAGE FORMING APPARATUS INCLUDING SAME

(75) Inventors: Keiichi Serizawa, Kanagawa (JP);
Hiroshi Johno, Kanagawa (JP);
Kazunori Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 13/439,999

(22) Filed: Apr. 5, 2012

(65) Prior Publication Data

US 2012/0300008 A1 Nov. 29, 2012

(30) Foreign Application Priority Data

May 26, 2011 (JP) ................................. 2011-118079
Jan. 24, 2012 (JP) ................................. 2012-011952

(51) Int. Cl.
*B41J 27/00* (2006.01)

(52) U.S. Cl.
USPC ............................ 347/257; 347/258; 347/259

(58) Field of Classification Search
USPC ................................................ 347/257–261
See application file for complete search history.

(56) References Cited

U.S. PATENT DOCUMENTS

| 5,537,262 A * | 7/1996 | Aoki et al. ..................... 359/822 |
| 7,502,046 B2 * | 3/2009 | Ono et al. ..................... 347/242 |
| 2005/0018320 A1 * | 1/2005 | Okumura ....................... 359/819 |
| 2010/0073786 A1 * | 3/2010 | Bornschein et al. .......... 359/824 |

FOREIGN PATENT DOCUMENTS

| JP | 5-72457 | 3/1993 |
| JP | 11-64752 | 3/1999 |
| JP | 2001-111155 | 4/2001 |
| JP | 2003-279825 | 10/2003 |
| JP | 2006-350251 | 12/2006 |
| JP | 2007-171626 | 7/2007 |
| JP | 2008-96957 | 4/2008 |
| JP | 2008-102291 | 5/2008 |
| JP | 2009-139464 | 6/2009 |
| JP | 2010-117510 | 5/2010 |

\* cited by examiner

*Primary Examiner* — Sarah Al Hashimi
(74) *Attorney, Agent, or Firm* — Oblon, Spivak, McClelland, Maier & Neustadt, L.L.P.

(57) ABSTRACT

An optical writer includes a light source, an optical part, a housing, and an elastically deformable retainer. The light source projects light against a target. The optical part is disposed on a light path between the light source and the target. The housing houses the light source and the optical part. The elastically deformable retainer is detachably fixed to the housing and includes a plurality of contact portions on an inner surface of the retainer to hold the optical part. The retainer elastically deforms to separate at least one of the contact portions from other contact portions to hold the optical part by the plurality of contact portions.

16 Claims, 12 Drawing Sheets

OPTICAL WRITER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2011-118079, filed on May 26, 2011, and 2012-011952, filed on Jan. 24, 2012, both in the Japan Patent Office, which are hereby incorporated herein by reference in their entirety.

BACKGROUND OF THE INVENTION

1. Field of the Invention

Exemplary aspects of the present invention generally relate to an optical writer and an image forming apparatus including same.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Typically, an image forming apparatus is equipped with an optical writer to form a latent image on an image bearing member, for example, a photoconductive drum. The optical writer illuminates and scans the image bearing member with a light beam also known as write light based on image information. The latent image is developed with toner, thereby forming a visible image, also known as a toner image.

Generally, such an optical writer includes a light source to project the light beam and optical parts such as a collimating lens, a scanning lens, a reflective mirror, and a polygon mirror. The light beam projected from the light source, for example, a laser diode (LD) passes through the collimating lens attached to a housing of the optical writer. The collimating lens shapes the light beam into a desired shape. Then, the light beam strikes the polygon mirror. The light beam is deflected and scanned by the polygon mirror, and passes through the optical parts including the scanning lens, the reflective mirror, and so forth. Ultimately, the light beam illuminates the image bearing member. In general, the collimating lens is adhered directly to the housing an adhesive agent.

Due to heightened awareness of environmental problems in recent years, there is increasing market demand for recycling the optical parts employed in the optical writer. However, the optical parts such as the collimating lens are adhered directly and firmly to the housing adhesives with strong adhesion to prevent the optical parts from displacement during and/or after shipment, thereby complicating efforts to separate the optical parts from the housing for recycling. For example, the optical parts need to be handled directly and separated from the housing forcibly.

The optical parts have finely processed surfaces that receive or project light so as to obtain certain optical characteristics. Such optical parts are very sensitive to damage and mechanical stress. When separating the optical parts from the housing upon recycling, the optical parts may be damaged, causing undesirable changes in the optical characteristics of the optical parts. For this reason, the optical characteristics cannot be assured. The optical parts are difficult to recycle, and hence are usually discarded.

To address such a difficulty, JP-2001-111155-A, for example, proposes a collimating lens removably attached to a light source unit. More specifically, the collimating lens is held by a lens barrel serving as a holder, and the lens barrel holding the collimating lens is fixed to the light source unit. When removing the collimating lens from the light source unit, the lens barrel is handled directly and separated from the light source unit. With this configuration, the lens barrel is the only place that is directly handled and separated from the light source unit or the housing, thereby preventing the lens surface of the collimating lens from getting damaged. Further, no stress is applied to the collimating lens upon separation from the light source unit. As a result, fluctuation of the optical characteristics of the collimating lens is prevented, and hence the collimating lens can be recycled.

As is generally the case for the collimating lens, when a configuration of the optical writer, for example, a beam spot diameter, changes, the external diameter of the collimating lens changes, accordingly. According to the related art, the inner diameter of the lens barrel for the collimating lens is almost the same as the external diameter of the collimating lens, and the collimating lens is inserted into the lens barrel. Consequently, if the external diameter of the collimating lens changes, a different lens barrel is needed to accommodate the collimating lens in a different size, thus increasing cost of manufacturing and necessitating management of different lens barrels. More specifically, a manufacturing line for different lens barrels or the holders needs to be established, resulting in a significant cost increase.

In view of the above, there is unsolved need for optical parts that can be recycled easily and inexpensively without getting damaged.

BRIEF SUMMARY

In view of the foregoing, in an aspect of this disclosure, there is provided an optical writer that includes a light source, an optical part, a housing, and an elastically deformable retainer. The light source projects light against a target. The optical part is disposed on a light path between the light source and the target. The housing houses the light source and the optical part. The elastically deformable retainer is detachably fixed to the housing and includes a plurality of contact portions on an inner surface of the retainer to hold the optical part. The retainer elastically deforms to separate at least one of the contact portions from other contact portions to hold the optical part.

According to another aspect, an image forming apparatus includes an image bearing member, the optical writer, and a developing device. The image bearing member bears a latent image on a surface thereof. The optical writer illuminates the surface of the image bearing member with light to form the latent image thereon. The developing device develops the latent image formed on the image bearing member using toner.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF DISCLOSED EMBODIMENTS

Figure 1:
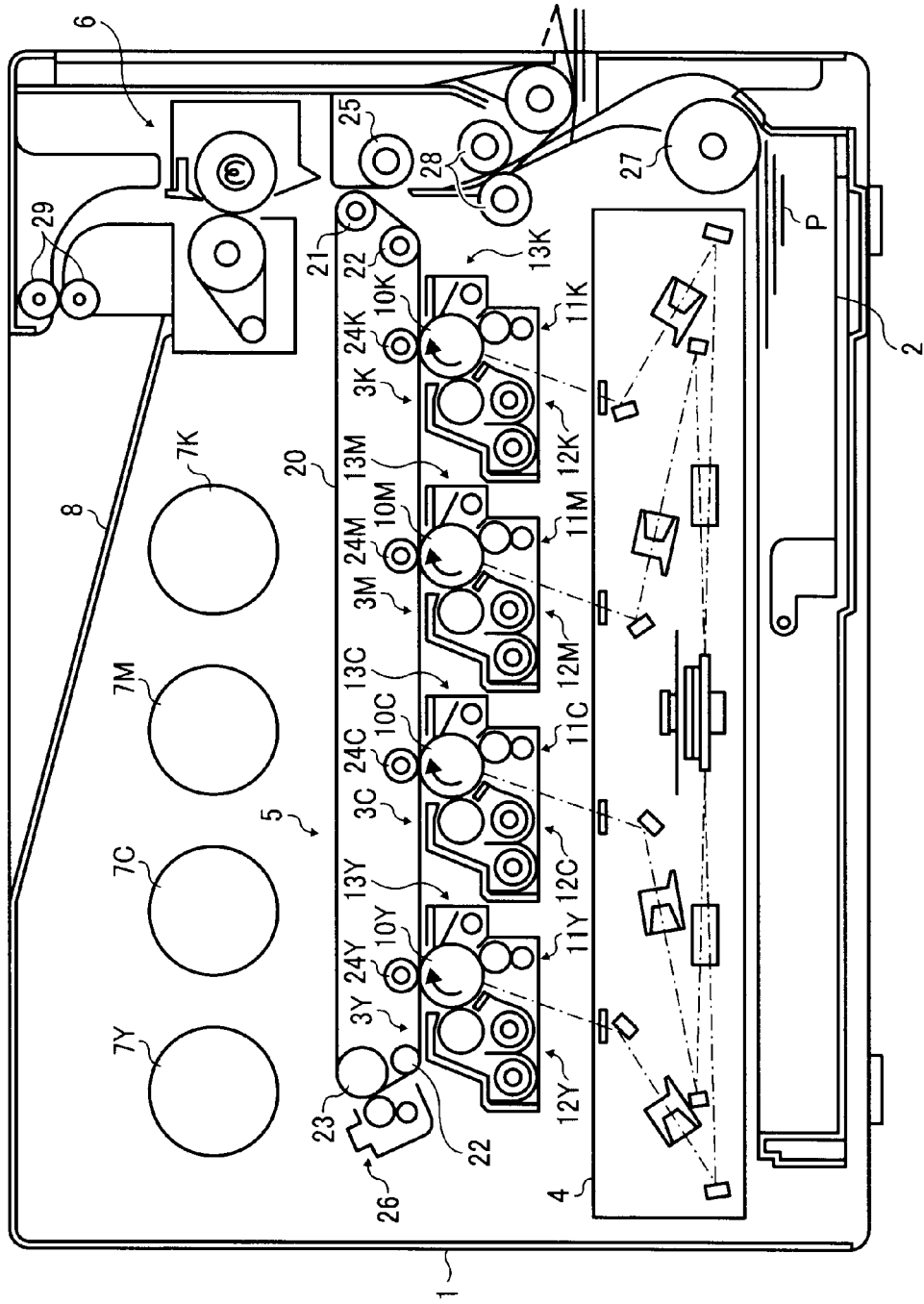
FIG. 1 is a schematic diagram illustrating a printer as an example of an image forming apparatus, according to an illustrative embodiment of the present invention.

A description is now given of illustrative embodiments of the present application. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially with reference to FIG. 1 a description is provided of an image forming apparatus according to an aspect of this disclosure.

FIG. 1 is a schematic diagram illustrating an electrophotographic color laser printer as an example of an image forming apparatus according to an illustrative embodiment of the present invention. The image forming apparatus includes a housing 1, a sheet cassette 2, image forming stations 3Y, 3C, 3M, and 3K, an optical writing unit 4, an intermediate transfer unit 5, a fixing device 6, and toner bottles 7Y, 7C, 7M, and 7K. The sheet cassette 2 disposed at the bottom of the image forming apparatus is detachable from the housing 1. The image forming stations 3Y, 3C, 3M, and 3K are disposed substantially in the center of the housing 1. The image forming stations 3Y, 3C, 3M, and 3K form toner images, also known as visible images, of the color yellow (Y), cyan (C), magenta (M), and black (K), respectively.

It is to be noted that reference characters Y, C, M, and K denote colors yellow, cyan, magenta, and black, respectively. To simplify the description, the reference characters Y, M, C, and K indicating colors are omitted herein unless otherwise specified.

Figure 2:
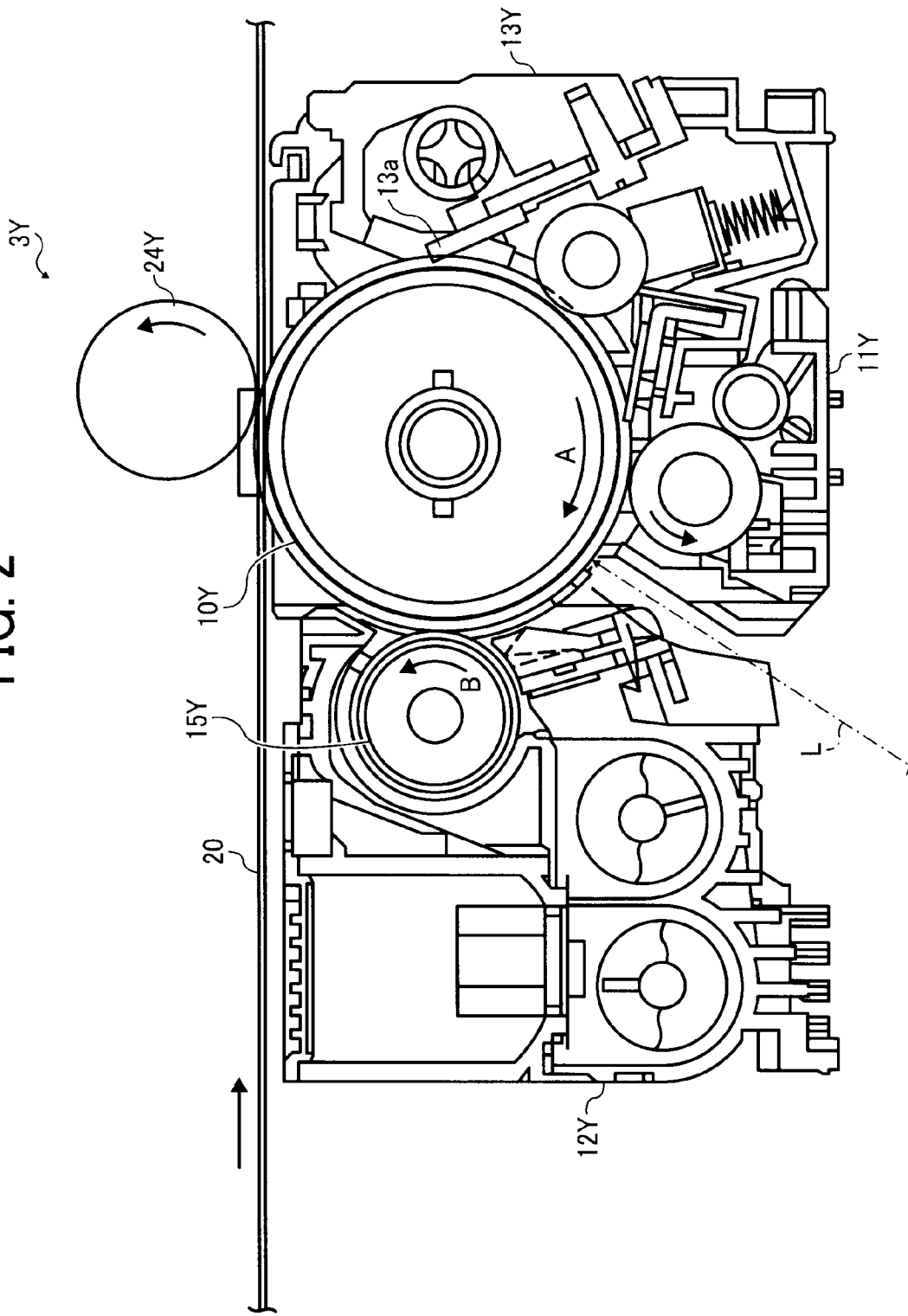
FIG. 2 is a schematic diagram illustrating an image forming station for yellow employed in the image forming apparatus of FIG. 1.

With reference to FIG. 2, a description is provided of the image forming stations 3Y, 3C, 3M, and 3K. FIG. 2 is a schematic enlarged diagram illustrating the image forming station 3Y for yellow as a representative example of the image forming stations 3. It is to be noted that the image forming stations 3Y, 3C, 3M, and 3K all have the same configuration as all the others, differing only in the color of toner employed.

As illustrated in FIG. 1, the image forming stations 3Y, 3C, 3M, and 3K include a respective one of photoconductive drums 10Y, 10C, 10M, and 10K, each serving as a latent image bearing member that rotates in a direction indicated by an arrow A (shown in FIG. 2). The photoconductive drums 10Y, 10C, 10M, and 10K are formed of an aluminum cylinder base having a diameter of approximately 40 mm covered with a photoconductive layer, for example, an organic photoconductive (OPC) layer. The image forming stations 3Y, 3C, 3M, and 3K include charging devices 11Y, 11C, 11M, and 11K each disposed around the photoconductive drums 10Y, 10C, 10M, and 10K, to charge the photoconductive drums 10Y, 10C, 10M, and 10K.

Developing devices 12Y, 12C, 12M, and 12K, and cleaning devices 13Y, 13C, 13M, and 13K are also disposed around the respective photoconductive drums 10Y, 10C, 10M, and 10K. The developing devices 12Y, 12C, 12M, and 12K develop latent images formed on the photoconductive drums 10Y, 10C, 10M, and 10K with toner. The cleaning devices 13Y, 13C, 13M, and 13K clean residual toner remaining on the photoconductive drums 10.

The optical writing unit 4 serving as an optical writer is disposed substantially below the image forming stations 3Y, 3C, 3M, and 3K. The optical writing unit 4 illuminates the photoconductive drums 10Y, 10C, 10M, and 10K with a write light beam L (shown in FIG. 2) to optically scan the photoconductive drums 10.

An intermediate transfer unit 5 is disposed substantially above the image forming stations 3Y, 3C, 3M, and 3K. The intermediate transfer unit 5 includes an intermediate transfer belt 20 entrained around a plurality of rollers and formed into a loop. Toner images formed in the image forming stations 3Y, 3C, 3M, and 3K are transferred onto the intermediate transfer belt 20 such that they are superimposed one atop the other, thereby forming a composite toner image.

The fixing device 6 is disposed downstream from the intermediate transfer unit 5 in the direction of conveyance of a recording medium to fix the toner image transferred onto the intermediate transfer belt 20 to a recording medium P. The toner bottles 7Y, 7C, 7M, and 7K storing toner of yellow, cyan, magenta, and black, respectively, are disposed substantially at an upper portion of the housing 1. The toner bottles 7Y, 7C, 7M, and 7K are detachably installed in the housing 1. The toner bottles 7Y, 7C, 7M, and 7K can be removed from the housing 1 by opening a sheet discharge tray 8 provided at the upper portion of the housing 1.

The optical writing unit 4 serving as an optical writer includes a laser diode serving as a light source. The laser diode projects the write light beam L against polygon mirrors 41a and 41b (shown in FIG. 3). The polygon mirrors 41a and 41b are a regular polygonal prism including multiple mirror surfaces. The write light beam L is deflected in a main scanning direction by the mirror surfaces of the polygon mirrors 41a and 41b while rotating. Subsequently, the write light beam L reflected by the plurality of mirrors scans the photoconductive drums 10Y, 10C, 10M, and 10K which have been charged uniformly by the charging devices 11Y, 11C, 11M, and 11K. Accordingly, electrostatic latent images of yellow, cyan, magenta, and black are formed on the surfaces of the photoconductive drums 10Y, 10C, 10M, and 10B, respectively. A detailed description of the optical writing unit 4 is provided later.

The intermediate transfer belt 20 of the intermediate transfer unit 5 serving as a transfer mechanism is entrained around a drive roller 21, a tension roller 22, and a driven roller 23, and rotates in a counterclockwise direction in FIG. 1 at a predetermined speed. The intermediate transfer unit 5 includes primary transfer rollers 24Y, 24C, 24M, and 24K, a secondary transfer roller 25, a belt cleaning device 26, and so forth. The primary transfer rollers 24Y, 24C, 24M, 24K primarily transfer the toner images formed on the photoconductive drums 10Y, 10C, 10M, and 10K onto the intermediate transfer belt 20 in a process known as a primary transfer process so that they are superimposed one atop the other, thereby forming a composite color toner image on the intermediate transfer belt 20.

The secondary transfer roller 25 transfers the composite toner image from the intermediate transfer belt 20 onto the recording medium P in a process known as a secondary transfer process. The belt cleaning device 26 cleans the residual toner remaining on the intermediate transfer belt 20 after the secondary transfer process.

Next, with reference to FIGS. 1 and 2, a description is provided of a color imaging process according to the illustrative embodiment of the present invention.

In the image forming stations 3Y through 3K, the photoconductive drums 10Y through 10K are uniformly charged by the charging devices 11Y through 11K. Subsequently, based on image information, the photoconductive drums 10Y through 10K are scanned by the write light beam L, thereby forming electrostatic latent images on the surfaces of the photoconductive drums 10Y through 10K. Then, the electrostatic latent images are developed with toner of respective colors borne on developing rollers 15Y, 15C, 15M, and 15K of the developing devices 12, thereby forming toner images of yellow, cyan, magenta, and black, respectively.

The primary transfer rollers 24Y, 24C, 24M, and 24K transfer primarily the toner images of yellow, cyan, magenta, and black from the photoconductive drums 10Y, 10C, 10M, and 10K onto the intermediate transfer belt 20 rotating in the counterclockwise direction so that they are superimposed one atop the other, thereby forming a composite color toner image on the intermediate transfer belt 20 in the primary transfer process. The toner images are transferred from the photoconductive drums 10Y, 10C, 10M, and 10K onto the intermediate transfer belt 20 at different timing such that the toner images are transferred at the same position on the intermediate transfer belt 20.

After the primary transfer, a cleaning blade 13a employed in the cleaning devices 13Y, 13C, 13M, and 13K cleans the surface of the photoconductive drums 10Y through 10K in preparation for the subsequent imaging cycle.

The toner in the toner bottles 7Y, 7C, 7M, and 7K is supplied to the developing devices 12Y, 12C, 12M, and 12K of the image forming stations 3Y, 3C, 3M, and 3K via toner transport channels, as necessary.

The recording medium P in the sheet cassette 2 is sent to a sheet conveyance path in the housing 1 by a sheet feed roller 27 disposed substantially near the sheet cassette 2. The recording medium P is temporarily stopped at a pair of registration rollers 28, and is sent to a secondary transfer area defined by the secondary transfer roller 25 and the intermediate transfer belt 20 at predetermined timing. In the secondary transfer area, the toner image formed on the intermediate transfer belt 20 is transferred onto the recording medium P in the secondary transfer process.

The recording medium P bearing the toner image passes through the fixing device 6 so that the toner image is fixed onto the recording medium P. Subsequently, the recording medium P is discharged onto the sheet discharge tray 8 by a sheet discharge roller 29. Similar to the photoconductive drum 10, the residual toner remaining on the intermediate transfer belt 20 is cleaned by the belt cleaning device 26 that contacts the intermediate transfer belt 20.

Figure 3:
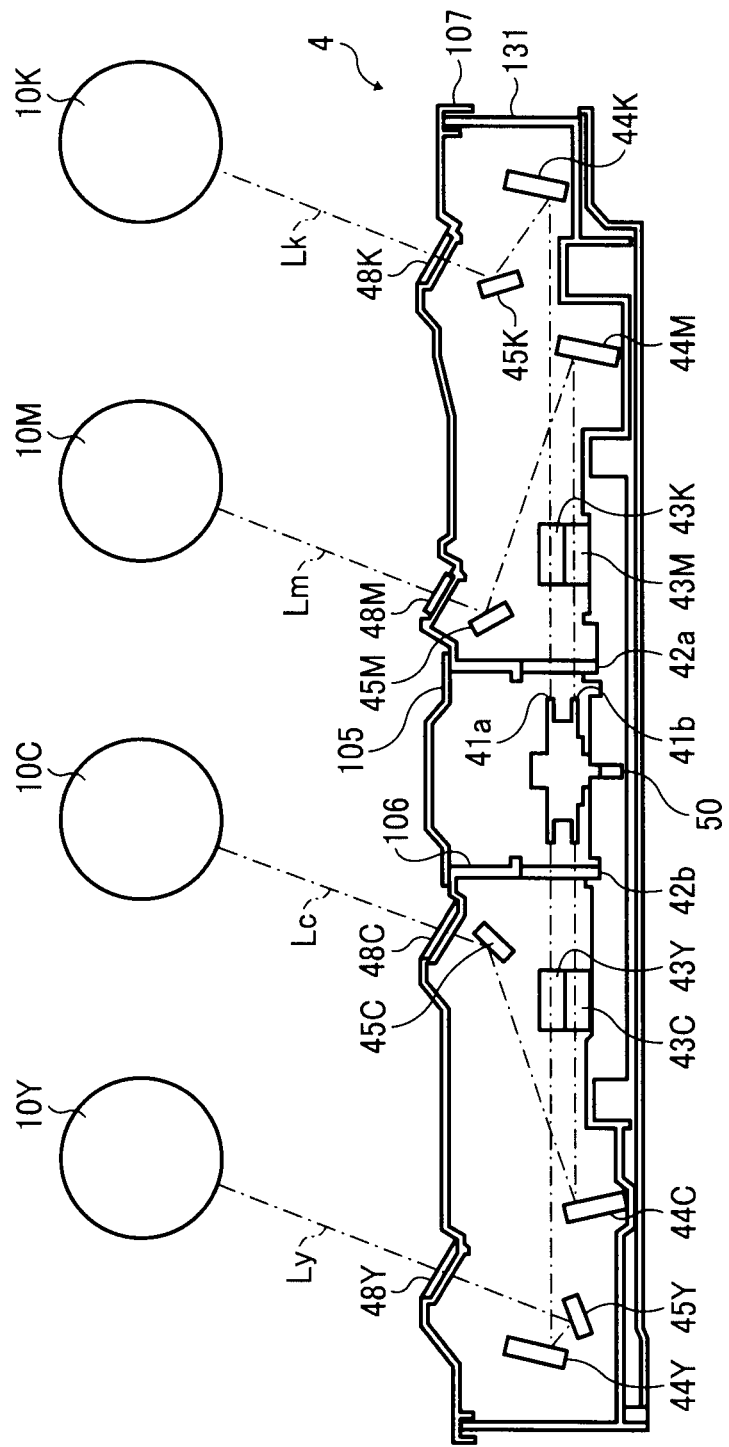
FIG. 3 is a schematic diagram illustrating an optical writer and a plurality of image bearing members employed in the image forming apparatus, according to an illustrative embodiment of the present invention.
Figure 4:
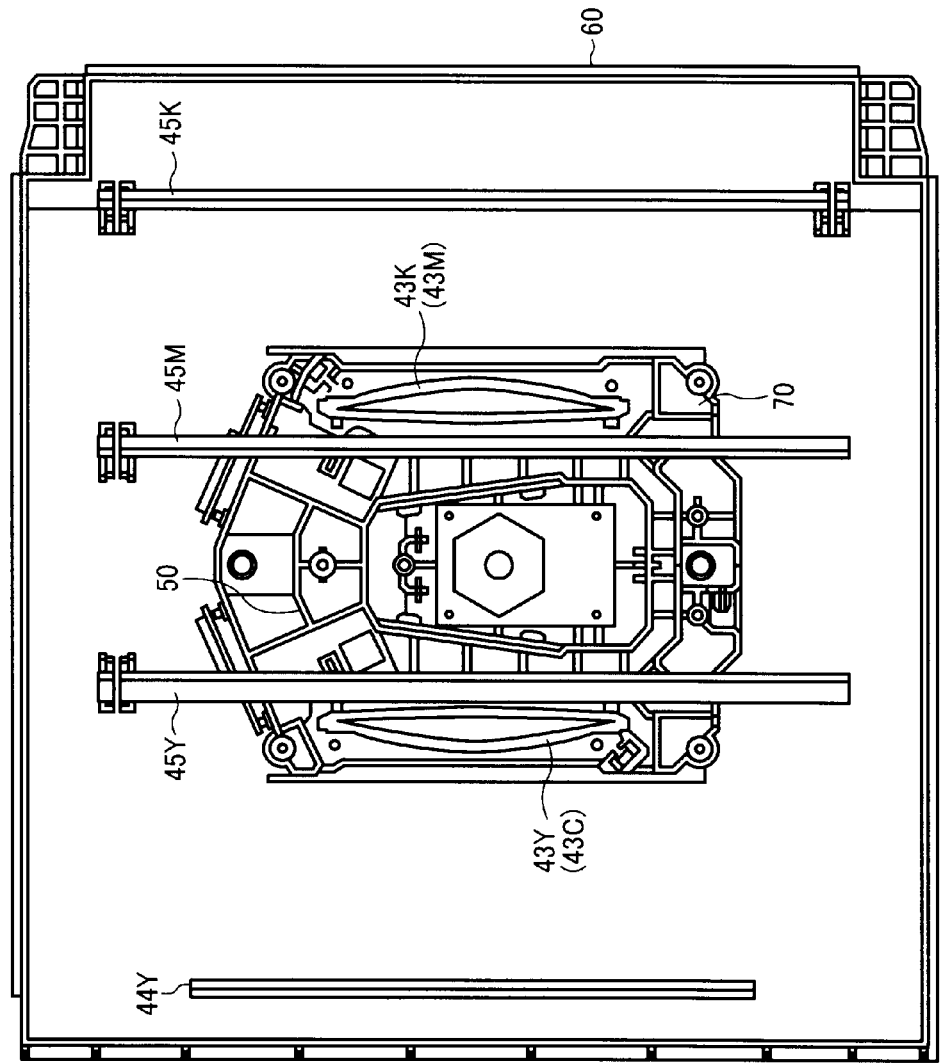
FIG. 4 is a plan view of the optical writer of FIG. 3.
Figure 5:
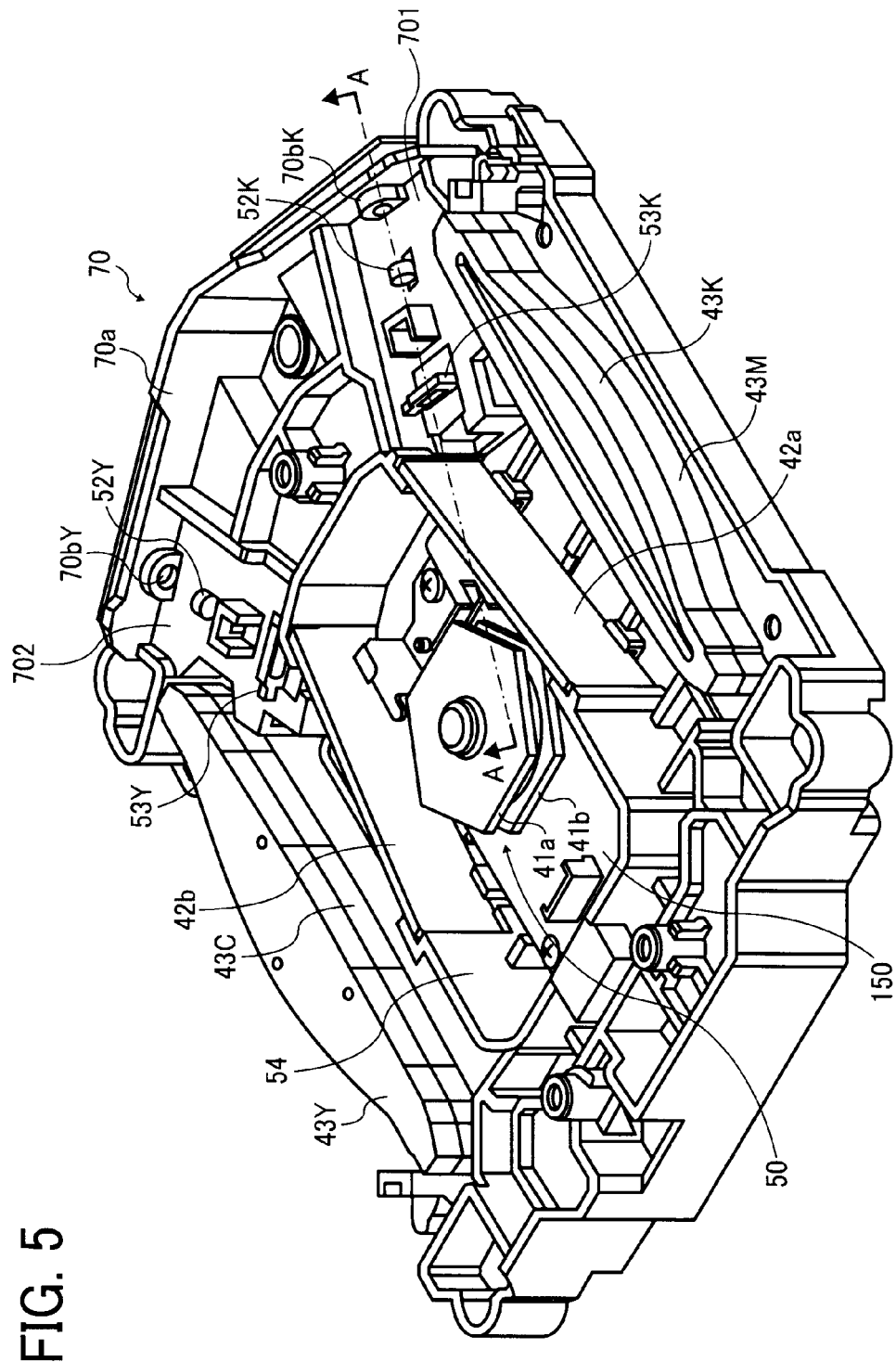
FIG. 5 is a perspective view schematically illustrating a first enclosure of the optical writer of FIG. 3.
Figure 6:
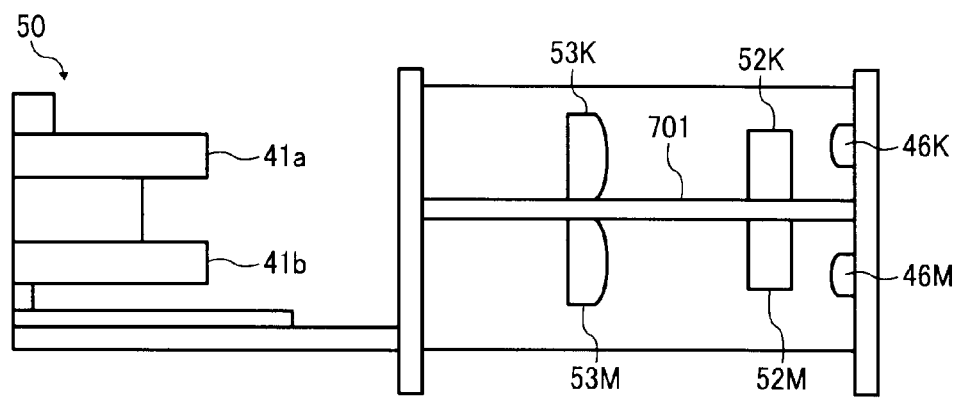
FIG. 6 is a cross-sectional view schematically illustrating the first enclosure along a line A-A in FIG. 5.

With reference to FIGS. 3 through 6, a description is provided of the optical writing unit 4. FIG. 3 is a schematic diagram illustrating the photoconductive drums 10Y through 10K and the optical writing unit 4 employed in the image forming apparatus according to an illustrative embodiment of the present invention. FIG. 4 is a top view schematically illustrating the optical writing unit 4 of FIG. 3. FIG. 5 is a perspective view schematically illustrating a first enclosure 70 of the optical writing unit 4. FIG. 6 is a cross-sectional view schematically illustrating the first enclosure 70 along a line A-A in FIG. 5.

As illustrated in FIG. 3, the optical writing unit 4 serving as the optical writer includes optical devices such as a polygon scanner 50, various reflective mirrors, lenses, and so forth. The optical devices such as the polygon scanner 50, the reflective mirrors, the lenses, and so forth are disposed in an optical housing 131. The optical housing 131 is open at the top. A cover 107 covers the top of the housing 131. The cover 107 includes dust proof glass panels 48Y, 48C, 48M, and 48K.

As illustrated in FIG. 4, the optical housing 131 is comprised of the first enclosure 70 and a second enclosure 60. The first enclosure 70 and the second enclosure 60 are made of resin. The first enclosure 70 encloses optical parts disposed on optical paths between the light source, and scanning lenses 43Y, 43C, 43M, and 43K. The second enclosure 60 encloses optical parts disposed on optical paths between the scanning lenses 43Y, 43C, 43M, and 43K, and the photoconductive drums 10Y, 10C, 10M, and 10K.

As illustrated in FIGS. 5 and 6, the first enclosure 70 encloses laser diodes 46Y, 46C, 46M, and 46K, collimating lenses 52Y, 52C, 52M, and 52K, cylindrical lenses 53Y, 53M, 53C, and 53K, the polygon scanner 50 serving as a rotary deflector, and the scanning lenses 43Y, 43M, 43C, and 43K. (For simplicity, the laser diodes 46Y and 46C, the collimating lens 52C, and the cylindrical lens 53C are not illustrated.)

As illustrated in FIG. 5, the polygon scanner 50 includes the polygon mirrors 41a and 41b, a polygon motor (not illustrated), and a circuit board 150 equipped with electrical parts that control the polygon motor. The six sides of each of the polygon mirrors 41a and 41b are reflective mirror surfaces. The polygon mirrors 41a and 41b are connected in a lateral direction such that the center of the regular polygonal prism of the polygon mirror 41a and the center of the regular polygonal prism of the polygon mirror 41b are aligned one atop the other, that is, are concentric. The polygon scanner 50 is fixed to a mounting portion of the first enclosure 70 surrounded by a soundproof wall 54 by a screw. The soundproof wall 54 includes two notches at which soundproof glass panel 42a and 42b are mounted.

The laser diodes 46Y, 46C, 46M, and 46K serving as light sources are attached to through-holes 70b formed in a side surface 70a of the first enclosure 70. It is to be noted that in FIG. 5 only a through-hole 70bK and a through-hole 70bY are illustrated. The laser diode 46K for black is attached to the through-hole 70bK, and laser diode 46Y for the color yellow is attached to the through-hole 70bY.

As illustrated in FIG. 6, the laser diode 46K for the color black is disposed above the laser diode 46M for the color magenta. The collimating lens 52K and the cylindrical lens 53K are attached to an upper surface of a first base 701. The collimating lens 52M is attached to a bottom surface of the first base 701 below the collimating lens 52K. The cylindrical lens 53M is attached to the bottom surface of the first base 701 below the cylindrical lens 53K. Similarly, although not illustrated, the laser diode 46C for cyan is disposed below the laser diode 46Y for yellow.

As illustrated in FIG. 5, the collimating lens 52Y and the cylindrical lens 53Y are attached to an upper surface of a second base 702. Although not illustrated, the collimating lens 52C for cyan is attached to the bottom surface of the second base 702 below the collimating lens 52Y for yellow. The cylindrical lens 53C is attached to the bottom surface of the second base 702 below the cylindrical lens 53Y.

The scanning lens 43K is disposed immediately above the scanning lens 43M. The scanning lens 43Y is disposed immediately above the scanning lens 43C. The scanning lenses 43Y, 43M, 43C, and 43K convert the angular motion of the scanning laser by the polygon mirrors 41a and 41b to linear motion, and focus light in the sub-scanning direction. Furthermore, the scanning lenses 43Y, 43M, 43C, and 43K correct a face tangle error of the polygon mirrors.

As illustrated in FIG. 3, the optical systems for the colors magenta (M) and black (K) are disposed at the right side of the polygon scanner 50. The optical devices for the colors yellow (Y) and cyan (C) are disposed at the left side of the polygon scanner 50.

Figure 7:
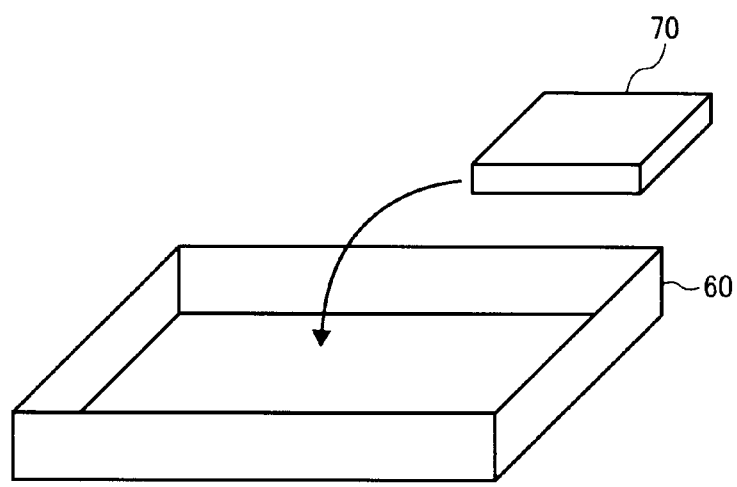
FIG. 7 is a schematic diagram illustrating the first enclosure installed in a second enclosure, according to an illustrative embodiment.

As illustrated in FIGS. 4 and 7, the first enclosure 70 is disposed substantially at the center of the second enclosure 60 such that the polygon scanner 50 comes substantially at the center of the optical writing unit 4. FIG. 7 is a schematic diagram illustrating the first enclosure 70 installed in the second enclosure 60.

As illustrated FIG. 3, the cover 107 includes an opening at the center thereof. An inner wall 106 is provided such that the inner wall 106 extends from the opening of the cover towards the polygon scanner side. More specifically, the bottom end of the inner wall 106 contacts the upper surface of the soundproof glass panels 42a and 42b, as well as the upper surface of the soundproof wall 54 (shown in FIG. 5). A deflector cover 105 is provided to cover the opening of the cover 107. With this configuration, the polygon scanner 50 is sealed by the soundproof glass panels 42a and 42b, the soundproof wall 54, the inner wall 106, and the deflector cover 105.

The write light beams Ly, Lc, Lm, and Lk projected from the laser diodes 46Y, 46C, 46M, and 46K, respectively, are collimated into parallel light fluxes by the collimating lenses 52Y, 52C, 52M, and 52K, and then pass through the cylindrical lenses 53Y, 53C, 53M, and 53K. After passing through the cylindrical lenses 53Y, 53C, 53M, and 53K, the light fluxes are focused in the sub-scanning direction (equivalent to the surface moving direction of the photoconductive drums 10 on the photoconductive drums 10).

Subsequently, the light fluxes are reflected by the mirror surfaces of the polygon mirrors 41a and 41b rotated at high speed by the polygon motor, thereby deflecting the light fluxes in the main scanning direction (equivalent to the axial direction on the surface of the photoconductive drums 10). The moving speed of the light fluxes deflected in the main scanning direction at a constant angular velocity by the polygon mirrors 41a and 41b is converted into a constant speed by the scanning lenses 43Y, 43M, 43C, and 43K, while the light fluxes are focused in the sub-scanning direction, and the face tangle error of the mirror surfaces of the polygon mirrors 41a and 41b is corrected.

The write light beams Ly, Lc, Lm, and Lk passed through the scanning lenses 43Y, 43C, 43M, and 43K are directed to the respective reflective mirrors of the optical systems of yellow, cyan, magenta, and black. For example, the write light beam Ly for the color yellow passed through the scanning lens 43Y is reflected by a first reflective mirror 44Y and a second reflective mirror 45Y so that the write light beam Ly is directed to the surface of the photoconductive drum 10Y. Similar to the write light beam Ly, the write light beams Lc, Lm, and Lk are reflected by first reflective mirrors 44C, 44M, and 44K, and second reflective mirrors 45C, 45M, and 45K so that the write light beams Lc, Lm, and Lk are directed to the surfaces of the photoconductive drums 10C, 10M, and 10K. The write light beams Ly, Lc, Lm, and Lk reflected by the second reflective mirrors 45Y, 45C, 45M, and 45K pass through the dust proof glass panels 48Y, 48C, 48M, and 48K of the cover 107, and then arrive at the photoconductive drums 10Y, 10C, 10M, and 10K.

Figure 8:
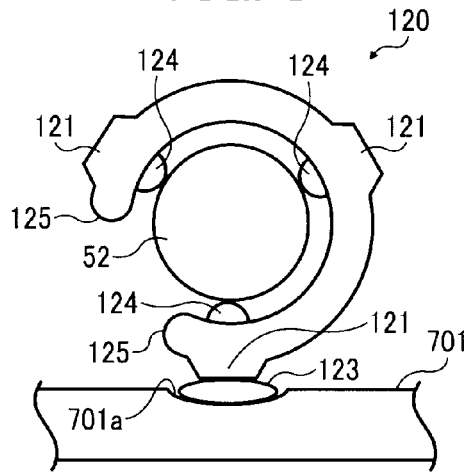
FIG. 8 is a schematic diagram illustrating a lens retainer and a collimating lens as viewed along an optical axis according to a first illustrative embodiment of the present invention.
Figure 9:
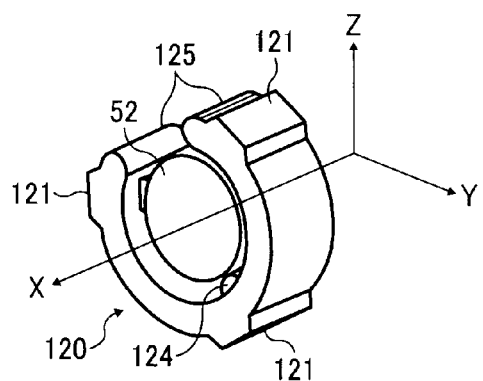
FIG. 9 is a perspective view schematically illustrating the lens retainer of FIG. 8 and the collimating lens.
Figure 10:
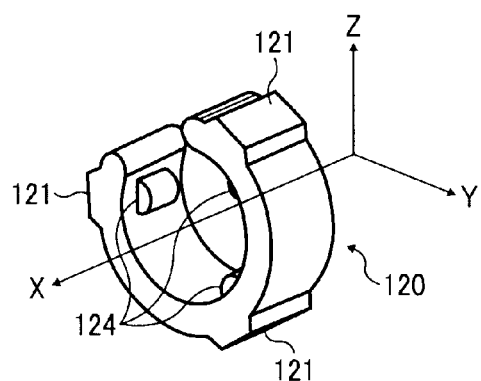
FIG. 10 is a perspective view schematically illustrating the lens retainer.

With reference to FIGS. 8 through 10, a description is provided of installation of the collimating lens 52 in the optical writing unit 4 according to the illustrative embodiment of the present invention. FIG. 8 is a schematic diagram illustrating a lens retainer 120 and the collimating lens 52 as viewed from an optical axis direction.

According to the illustrative embodiment, the collimating lens 52 is clamped by and fixed to the lens retainer 120. More specifically, the collimating lens 52 held by the lens retainer 120 is fixed to the base 701 (702) of the first enclosure 70 via the lens retainer 120. The lens retainer 120 is fixed to the base 701 using an adhesive agent.

FIG. 8 is a schematic diagram illustrating the lens retainer 120 and the collimating lens 52 as viewed along a direction of an optical axis according to a first illustrative embodiment. FIG. 9 is a perspective view schematically illustrating the lens retainer 120 and the collimating lens 52. FIG. 10 is a cross-sectional perspective view schematically illustrating the lens retainer 120.

As illustrated in FIGS. 8 and 9, the lens retainer 120 has an annular shape and includes a notch or an incision. The lens retainer 120 includes a plurality of flanges 121 provided equally spaced on the circumferential surface of the lens retainer 120. More specifically, the lens retainer 120 has three flanges projecting from the circumferential surface thereof. The flanges 121 serve as housing attachment portions that are fixed to the base 701 of the first enclosure 70. A plurality of projections 124 is provided equally spaced on the inner circumference of the lens retainer 120 to hold the collimating lens 52 on the inner circumference of the lens retainer 120. According to the present illustrative embodiment, the plurality of projections 124 and the lens retainer 120 are constituted as a single integrated unit. For example, the plurality of projections 124 and the lens retainer 120 may be molded into a single piece.

As illustrated in FIG. 8, the projections 124 contacts the ridge of the collimating lens 52 which is parallel to the optical axis direction (corresponding to an axis X in FIG. 9), thereby holding or clamping the collimating lens 52 by the lens retainer 120. The lens retainer 120 is formed of substantially transparent material that allows ultraviolet (UV) light to pass therethrough.

A diameter of an incircle formed by connecting the peaks of the projections 124 of the lens retainer 120 is smaller than the external diameter of the collimating lens 52. The lens retainer 120 is made of material that is relatively hard, but elastic to some extent, such as resin. As described above, the lens retainer 120 includes the incision having an end portion 125 at opposed ends of the incision. The end portions 125 are spaced apart facing each other. As illustrated in FIG. 1, as the end portions 125 are pulled away from each other, increasing the space between the opposed ends of the incision, the lens retainer 120 deforms, causing at least one of the projections 124 to separate from the other projection. Accordingly, the diameter of the incircle formed by the peaks of the projections 124 is increased.

Figure 11:
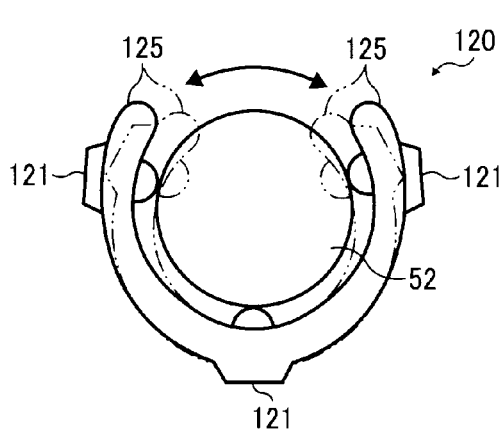
FIG. 11 is a schematic diagram illustrating the collimating lens and the lens retainer to explain installation of the collimating lens on the lens retainer.

Upon installation of the collimating lens 52 in the lens retainer 120, the end portions 125 of the lens retainer 120 indicated by a broken line in FIG. 11 are separated from each other so that the internal diameter of the lens retainer 120 is increased as indicated by a solid line in FIG. 11. As a result, the distance between the projections 124 increases. After the internal diameter of the lens retainer 120 is increased as described above, the collimating lens 52 is inserted into the lens retainer 120, and then the end portions 125 are released. Subsequently, as illustrated in FIG. 11, the distance between the projections 124 formed on the inner circumferential surface of the lens retainer 120 is reduced, thereby contacting the ridge of the collimating lens 52 and holding or clamping the collimating lens 52 at three points, that is, the projections 124.

The lens retainer 120 holding the collimating lens 52 is attached to the base 701 of the first enclosure 70 as follows. First, the lens retainer 120 is held by a chuck, not illustrated, that can adjust the position of the lens retainer 120 in the optical axis direction, the sub-scanning direction (the direction of Z axis in FIG. 9), and the main scanning direction (the direction of Y axis in FIG. 9). The base 701 includes a lens retainer mount 701a. One of the flanges 121 of the lens retainer 120 faces the lens retainer mount 701a of the base 701.

Subsequently, while monitoring optical characteristics, the position of the lens retainer 120 is adjusted by moving the chuck such that desired optical characteristics of the scan light are obtained on the photoconductive drums 10. After the desired optical characteristics are obtained, a portion of a space between the lens retainer mount 701a and the flange 121 is filled in with a UV curable adhesive agent 123, and illuminated with UV light so that the adhesive agent 123 is cured. Accordingly, the lens retainer 120 is fixed to the lens retainer mount 701a. According to the above-described illustrative embodiment, after adjusting the position of the lens retainer 120, the adhesive agent 123 enters the space between the lens retainer mount 701a and the flange 121.

Alternatively, the position of the lens retainer 120 is adjusted after the portion of the space between the lens retainer mount 701a and the flange 121 is filled in with the adhesive agent 123. Since the lens retainer 120 is made of material allowing the UV light to penetrate therethrough, the adhesive agent 123 can be illuminated with the UV light through the lens retainer 120. Accordingly, the lens retainer 120 is fixed to the lens retainer mount 701a with ease. After the lens retainer 120 is fixed to the retainer mount 701a with the adhesive agent 123, the chuck is removed.

When recycling the collimating lens 52, the lens retainer 52 is separated from the lens retainer mount 701a by handling the lens retainer 120. With this configuration, when recovering the collimating lens 52 from the optical writing unit 4, the collimating lens 52 is not handled directly. Hence, the optical surfaces such as a light incident surface and a projection surface of the collimating lens 52 are prevented from getting touched by fingers and hence protected from damage. Furthermore, when separating from the lens retainer mount 701a, the collimating lens 52 receives no stress. As a result, when removing the collimating lens 52 from the optical writing unit 4, fluctuation of the optical characteristics of the collimating lens 52 is prevented.

Figure 12:
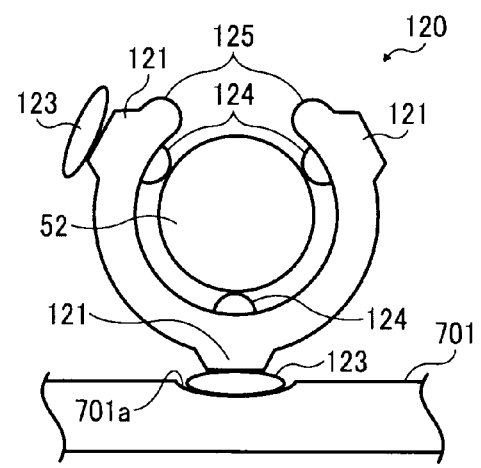
FIG. 12 is a schematic diagram illustrating one of the flanges of the lens retainer, different from the one that has been used previously, being fixed to a lens retainer mount of the first enclosure.

When using the recycled collimating lens 52 in another optical writing unit after the collimating lens 52 is removed from the optical writing unit 4, one of the flanges 121, different from the one that has been used previously, is fixed to the lens retainer mount 701a using the adhesive agent, as illustrated in FIG. 12. FIG. 12 is a schematic diagram illustrating one of the flanges 121, different from the one that has been used previously, is fixed to the lens retainer mount 701a using the adhesive agent 123.

According to the above-described illustrative embodiment, the lens retainer 120 includes the plurality of flanges 121. As the collimating lens 52 is recycled, the flange 121 having a clean surface on which no adhesive agent or the like remains is attached to the lens retainer mount 701a of the first enclosure 70. Accordingly, the flange 121 is adhered reliably to the lens retainer mount 701a.

If the adhesive agent 123 remains undesirably on the surface of the flange 121 and such a flange is used again, enough space is not secured between the flange 121 and the lens retainer mount 701a due to the residual adhesive agent 123. Consequently, an amount of the fresh adhesive agent 123 to enter between the flange 121 and the lens retainer mount 701a is reduced, and thus the lens retainer 120 is not securely fixed to the lens retainer mount 701a. If this occurs, the lens retainer 120 separates from the lens mounting portion 701a due to vibration during shipment and/or during actual use. Furthermore, the surface of the flange 121 on which the adhesive agent 123 remains hinders adjustment of the position of the lens retainer 120 in the sub-scanning direction (the direction of Z axis), thereby complicating fine adjustment.

The polygon scanner 50, the laser diodes 46, and so forth in the optical writing unit 4 are also subjected to recycling when reaching the end of their product life cycles. When the polygon mirror 50 and the laser diodes 46 are replaced with new ones, the relative positions of the collimating lens 52 and these parts are changed, thereby complicating efforts to achieve desired optical characteristics. In order to achieve the desired optical characteristics, the orientation and the position of the collimating lens 52 need to be readjusted. In such a case, the collimating lens 52 needs to be separated from the first enclosure 70 by separating the lens retainer 120 from the lens retainer mount 701a.

Figure 13:
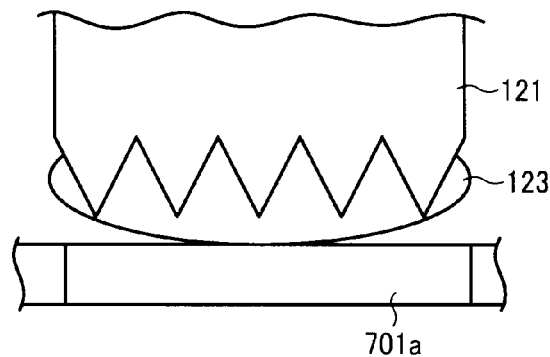
FIG. 13 is an enlarged schematic diagram illustrating the lens retainer adhered to the lens retainer mount of the first enclosure.

If the adhesive agent 123 remains on the lens retainer mount 701a, the lens retainer 120 does not adhere well to the lens retainer mount 701a. As a result, the optical writing unit 4 cannot be reused. In view of the above, according to an illustrative embodiment, the adhesive agent 123 sticks to the lens retainer 120, rather than the lens retainer mount 701a as the lens retainer 120 is separated from the first enclosure 70. More specifically, as illustrated in FIG. 13, the surface of the flange 121 adhered to the lens retainer mount 701a includes asperities so that the surface area of the flange 121 is greater than that of the lens retainer mount 701a. With this configuration, as the lens retainer 120 is separated from the lens retainer mount 701a, the adhesive agent 123 sticks to the flange 121 of the lens retainer 120, thereby preventing the adhesive agent 123 from remaining on the lens retainer mount 701a.

As previously described with reference to FIG. 12, one of the flanges 121, other than the one that has been used previously, is disposed facing the lens retainer mount 701a and fixed thereto using the adhesive agent 123 after the position of the collimating lens 52 is adjusted. Accordingly, the adhesive agent 123 sticks to the lens retainer 120 as the lens retainer 120 is separated from the lens retainer mount 701a, thereby facilitating recycle of the optical writing unit 4.

According to the above-described illustrative embodiment, the diameter of the incircle of projections 124 of the lens retainer 120 can be increased by separating the end portions 125 of the lens retainer 120, that is, by widening the space between the end portions 125. With this configuration, even when the external diameter of the collimating lens 52 changes, the same lens retainer 120 can be used by changing an amount of elastic deformation of the lens retainer 120. If the configuration of the optical writing unit 4 of the image forming apparatus changes, the configuration of the parts to be installed in the optical writing unit changes. More specifically, the collimating lens 52 is an important optical element that determines a beam spot diameter on the photoconductive drum 10.

Depending on the divergence angle of the laser diode 46 serving as a light source, an effective aperture of the lens changes, thus changing the external diameter of the collimating lens 52. If the lens retainer 120 can only hold a collimating lens having a certain external diameter, the lens retainer 120 cannot accommodate the collimating lens having a size different from the previous collimating lens. This means that the same lens retainer cannot be used in an optical writing unit having a different configuration. As a result, different lens retainers need to be manufactured to accommodate various optical writing units having different configurations, resulting in an increase in manufacturing and management cost for different lens retainers.

Furthermore, if there is a change in the configuration of the optical writing unit in which a collimating lens having an external diameter greater than the previous collimating lens is employed, the new collimating lens cannot fit in the lens retainer 120. Even if such a lens retainer still has the flange 121 that has not been used, the lens retainer cannot be recycled.

In view of the above, according to the above-described illustrative embodiment, as illustrated in FIG. 11, the shape of the lens retainer 120 is elastically changeable to hold the collimating lens 52. With this configuration, even when the external diameter of the collimating lens 52 changes, the same lens retainer 120 can be used to hold the collimating lens 52 by changing the amount of elastic deformation of the lens retainer 120. Accordingly, the common lens retainer 120 can be employed in the optical writing unit having different configurations.

For example, when holding a collimating lens having a diameter greater than that of a collimating lens used in an optical writing unit with a certain configuration, the end portions 125 of the lens retainer 120 is separated from one another, that is, the distance between the end portions 125 is increased. Accordingly, the collimating lens with a large diameter can be held by the lens retainer 120. Since the lens retainer 120 can hold the collimating lenses having different external diameters, the common lens retainer can be used in various optical writing units having different configurations, thereby reducing manufacturing and management cost for different lens retainers.

With this configuration, even when the external diameter of a collimating lens is larger than the previous collimating lens, the same lens retainer, that is, the lens retainer 120 can be reused. In this case, the end portions 125 of the lens retainer 120 is separated from one another, that is, the distance between the end portions 125 is increased to remove the current collimating lens and the new collimating lens is fixed to the lens retainer 120. Accordingly, the collimating lens with a large diameter can be held by the lens retainer 120. Because the collimating lens 52 is only clamped by the lens retainer 120, the collimating lens 52 can be removed easily by pulling the end portions 125 of the lens retainer 120 away from each other. Accordingly, the lens retainer 120 can hold the new collimating lens having a different diameter, and the flange 121 that has not been used is adhered to the housing. Accordingly, the lens retainer 120 is recycled.

Generally, the external diameter of the collimating lens 52 used in the optical writing unit 4 does not change much even when the configuration of the optical writing unit 4 changes. Thus, the elastic deformation of the lens retainer 120 alone can accommodate the change in the size of the collimating lens 52 sufficiently. More specifically, the difference in the size of the external diameter of the collimating lens due to the change in the configuration of the optical writing unit is a few mm in the similar series of the optical writing unit. Therefore, the elastic deformation of the lens retainer 120 alone can accommodate the change in the external diameter of the collimating lens.

According to the above-described illustrative embodiment, three projections 124 are provided equally spaced on the inner circumferential surface of the lens retainer 120. The collimating lens 52 is held by the projections 124.

Alternatively, the lens retainer 120 may not include the projections 124. In this case, the inner circumferential surface of the lens retainer 120 contacts and holds the ridge of the collimating lens 52. When the end portions 125 are separated from one another to increase the internal diameter of the lens retainer 120 and hold the collimating lens 52, the collimating lens 52 contacts the inner circumferential surface of the lens retainer 120 at three locations. In other words, the inner circumferential surface of the lens retainer 120 contacting the ridge of the collimating lens 52 serves as a contact portion.

However, it is preferable that the lens retainer 120 include the projections 124 on the inner circumferential surface thereof, because the pressure of the lens retainer 120 pressing against the collimating lens 52 due to the resilience of the lens retainer 120 is concentrated on the projections 124. Hence, the collimating lens 52 can be held by the lens retainer 120 more reliably. The projection 124 may be disposed substantially near each of the end portions 125, and one projection 124 may be disposed on the inner circumferential surface of the lens retainer 120. In this case, the collimating lens 52 can be fixed to the lens retainer 120 at three points.

The number of the projections 124 is not limited to three. The lens retainer 120 may include more than three projections 124.

Figure 14A:
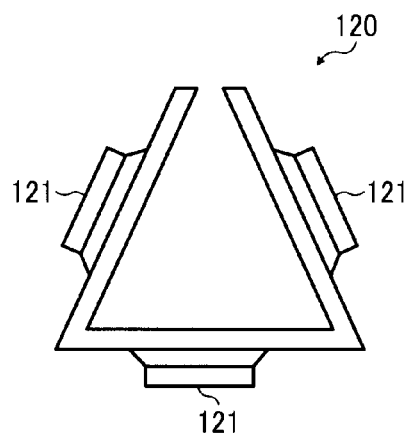
FIG. 14A is a schematic diagram illustrating another example of the lens retainer.
Figure 14B:
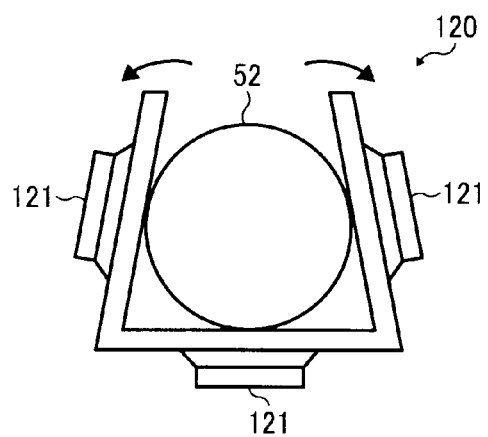
FIG. 14B is a schematic diagram illustrating the lens retainer of FIG. 14A holding the collimating lens.

With reference to FIGS. 14A and 14B, a description is provided of another example of the lens retainer 120. FIG. 14A is a schematic diagram illustrating another example of the lens retainer 120. FIG. 14B is a schematic diagram illustrating another example of the lens retainer holding the collimating lens 52.

According to the above-described illustrative embodiment, the lens retainer 120 has an annular shape, a portion of which includes a notch or an incision. Alternatively, as illustrated in FIG. 14A, the lens retainer 120 may have a substantially triangular shape as viewed along the optical axis direction including an incision. As illustrated in FIG. 14B, upon installation of the collimating lens 52 on the lens retainer 120, two sides of the triangular lens retainer 120 elastically open as indicated by arrows to clamp or hold the collimating lens 52. In this case, two slanted surfaces and the bottom surface of the lens retainer 120 serve as contact portions that contact the collimating lens 52.

Figure 15A:
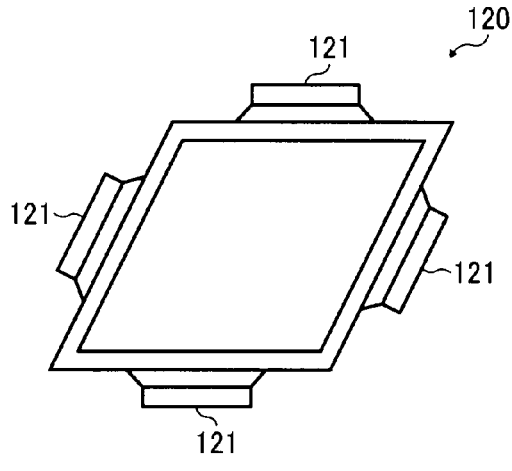
FIG. 15A is a schematic diagram illustrating still another example of the lens retainer.
Figure 15B:
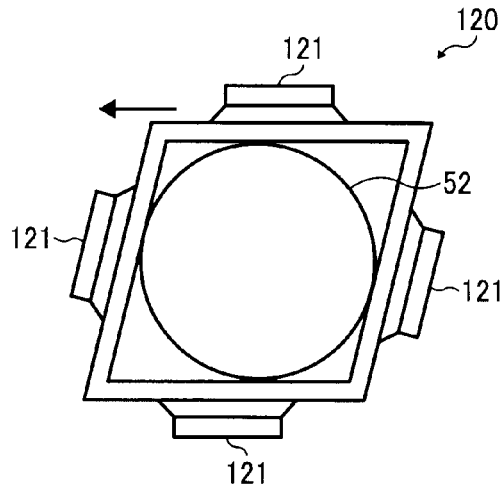
FIG. 15B is a schematic diagram illustrating the lens retainer of FIG. 15A holding the collimating lens.

Still alternatively, as illustrated in FIGS. 15A and 15B, the lens retainer 120 may not include an incision, but can still elastically deform to hold the collimating lens 52. FIG. 15A is a schematic diagram illustrating another example of the lens retainer 120. FIG. 15B is a schematic diagram illustrating the lens retainer 120 holding the collimating lens 52.

As illustrated in FIG. 15A, the lens retainer 120 has a substantially parallelogram shape as viewed along the optical axis direction. Upon installation of the collimating lens 52 on the lens retainer 120, as illustrated in FIG. 15B, the upper portion of the lens retainer 120 shifts to deform, allowing the collimating lens 52 to be inserted in the lens retainer 120. After the collimating lens 52 is inserted into the lens retainer 120, the collimating lens 52 is held at four points by the lens retainer 120 due to the resilience of the lens retainer 120.

The lens retainer 120 is made of material having a high stiffness, yet elastically deformable so that the lens retainer 120 can change its shape into a desired shape to hold the collimating lens 52. The material needs to be elastic to some extent for the following reason. If the lens retainer 120 is made of elastic material such as rubber that can be deformed easily, when the polygon mirror rotates and vibrates, causing the lens retainer 120 to vibrate, the collimating lens 52 held by the retainer vibrates. Therefore, by employing the material having a high stiffness, yet elastically deformable, the lens retainer 120 can prevent the collimating lens 52 from vibrating.

According to the above-described illustrative embodiment, the shape of the lens retainer 120 is elastically changed to change the distance between the projections 124 or the contact portions to hold the collimating lens 52. Alternatively, the contact portions, for example, the projections 124 provided on the inner circumferential surface of the lens retainer 120 may have a shape of a spring such as a leaf spring. In this configuration, the lens retainer 120 includes leaf springs on the inner circumferential surface thereof that can elastically change the shape, thereby changing the distance between the leaf springs and clamping the collimating lens 52 between the leaf springs. Furthermore, the lens retainer 120 including the leaf springs can elastically deform, thereby holding the collimating lens 52.

Alternatively, leaf springs may be attached to the inner circumferential surface of the lens retainer 120. Still alternatively, one of the plurality of contact portions may be a leaf spring and other contact portions may be projections that project from the inner circumferential surface of the lens retainer 120. In this configuration, the leaf spring may press the collimating lens 52 against the projections, thereby reliably holding the collimating lens 52.

Figure 16:
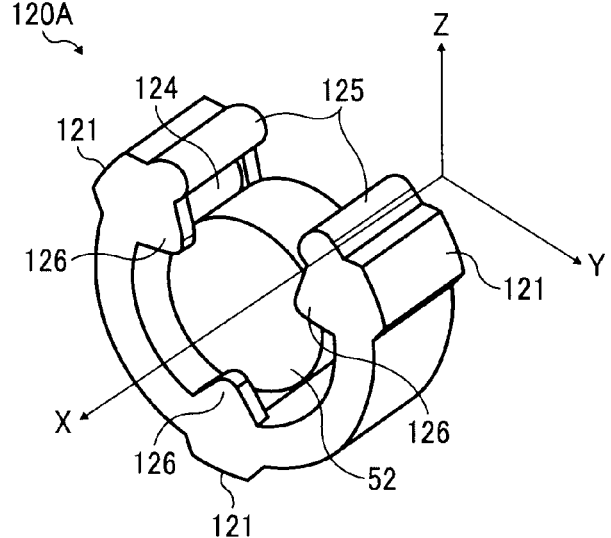
FIG. 16 is a perspective view schematically illustrating a lens retainer and the collimating lens according to a second illustrative embodiment.
Figure 17:
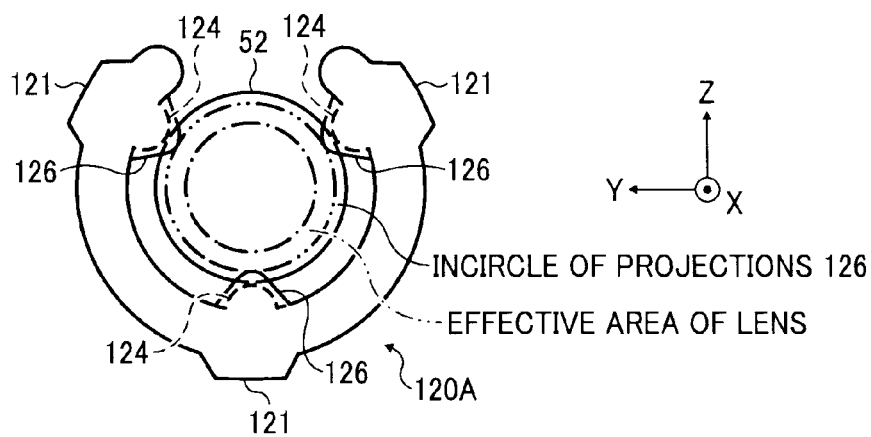
FIG. 17 is a schematic diagram illustrating the lens retainer of FIG. 16 and the collimating lens as viewed along the direction of the optical axis.

With reference to FIGS. 16 and 17, a description is provided of the lens retainer according to a second illustrative embodiment of the present invention.

FIG. 16 is a perspective view schematically illustrating a lens retainer 120A and the collimating lens 52 according to the second illustrative embodiment. FIG. 17 is a schematic diagram illustrating the lens retainer 120A and the collimating lens 52 as viewed along the direction of the optical axis.

According to the second illustrative embodiment, as illustrated in FIGS. 16 and 17, the lens retainer 120A includes a positioning projection 126 serving as a positioning member. As illustrated in FIGS. 16 and 17, a plurality of positioning projections 126 extends from a side surface of the lens retainer 120 perpendicular to the direction of the optical axis towards the center of the diameter of the lens retainer 120.

In the present embodiment, three positioning projections 126 are disposed equally spaced in the circumferential direction. The light incident surface or the light projection surface of the collimating lens 52, both of which are the surfaces perpendicular to the direction of the optical axis, contacts the positioning projections 126, and the collimating lens 52 is held by the lens retainer 120A. With this configuration, the collimating lens 52 is positioned in place around the main scanning direction (the direction of Y axis) and around the sub-scanning direction (the direction of Z axis).

When the collimating lens 52 held by the lens retainer 120A is positioned in place around the main scanning direction (the direction of Y axis) as well as around the sub-scanning direction (the direction of Z axis) by the positioning projections 126, an adjustment range of the lens retainer 120 holding the collimating lens 52 upon installation thereof on the base 701 of the first enclosure 70 can be narrowed around Y axis and Z axis. Accordingly, the collimating lens 52 held by the lens retainer 120A is adjusted with ease.

As illustrated in FIG. 17, an external diameter of an incircle formed by connecting the peaks of the positioning projections 126 of the lens retainer 120A indicated by a double-dot-dash line is larger than an effective aperture (effective area) of the collimating lens 52 indicated by a dash-dot line. With this configuration, the positioning projections 126 can contact outside the effective area (non-effective area) of the projection surface or the incident surface of the collimating lens 52. The non-effective area of the collimating lens 52 includes a certain amount of clearance regardless of the size of the collimating lens 52 so that the positioning projections 126 can contact the non-effective area of the collimating lens 52.

Figure 18:
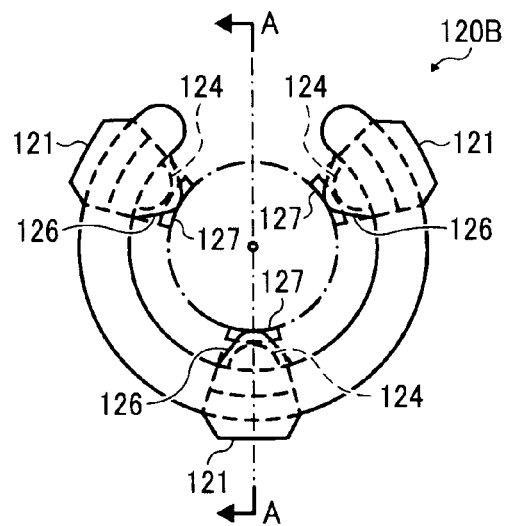
FIG. 18 is a schematic diagram illustrating a lens retainer as viewed along the direction of the optical axis according to a third illustrative embodiment of the present invention.
Figure 19:
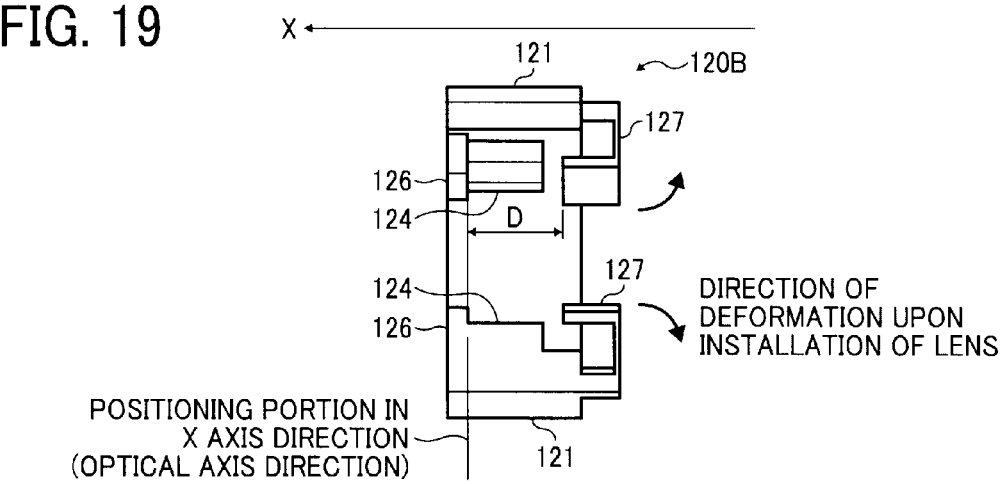
FIG. 19 is a cross-sectional view schematically illustrating the lens retainer of FIG. 18 as viewed along a line A-A in FIG. 18.
Figure 20:
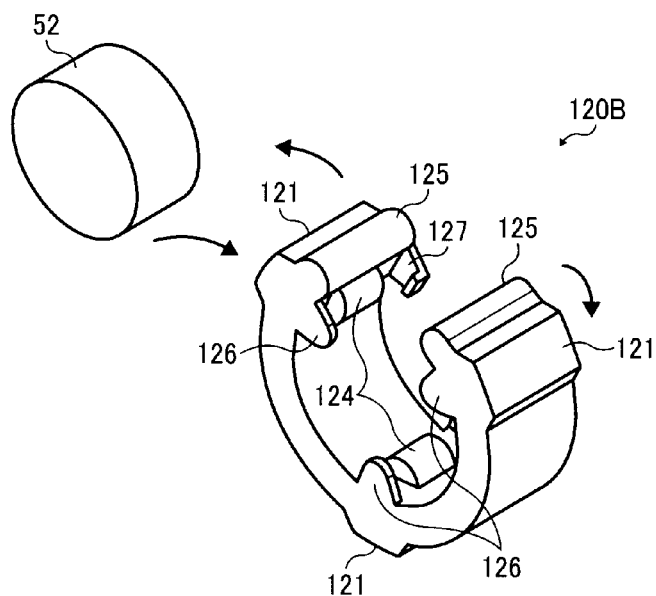
FIG. 20 is a perspective view schematically illustrating the collimating lens and the lens retainer as the collimating lens is installed on the lens retainer.

With reference to FIGS. 18 through 20, a description is provided of the lens retainer according to a third illustrative embodiment of the present invention. FIG. 18 is a schematic diagram illustrating a lens retainer 120B as viewed along the direction of the optical axis according to the third illustrative embodiment. FIG. 19 is a cross-sectional view schematically illustrating the lens retainer 120A as viewed along a line A-A in FIG. 18. FIG. 20 is a perspective view schematically illustrating the collimating lens 52 and the lens retainer 120B as the collimating lens 52 is installed on the lens retainer 120B.

According to the third illustrative embodiment, the lens retainer 120B includes a pressing member 127 such as a spring to press the collimating lens 52 installed on the lens retainer 120B against the positioning projections 126.

As illustrated in FIG. 20, the pressing member 127 has a hook-like shape or unciform shape, and is provided on a surface opposite the surface provided with the positioning projections 126. As illustrated in FIG. 19, a distance D between the positioning projection 126 and a leading edge of the pressing member 127 is shorter than a length of the collimating lens 52 in the direction of the optical axis. As illustrated in FIG. 18, an incircle formed by connecting the peaks of the pressing members 127 indicated by the dash-dot line is substantially the same as the incircle of the positioning projections 126.

As illustrated in FIG. 20, when the collimating lens 52 is installed on the lens retainer 120B, the end portions 125 of the lens retainer 120B are separated from each other as indicated by arrows and then the collimating lens 52 is installed between the end portions 125 from the positioning projection 126 side. Accordingly, the pressing member 127 is pushed in the direction of the optical axis by the collimating lens 52, and the collimating lens 52 is installed on the lens retainer 120B.

According to the third illustrative embodiment, the pressing members 127 press the collimating lens 52 against the positioning projections 126 so that the collimating lens 52 can contact reliably the positioning projections 126. That is, the collimating lens 52 can be positioned in place reliably.

Furthermore, according to the present embodiment, because the collimating lens 52 is interposed between the positioning projections 126 and the pressing members 127 in the direction of X axis reliably, misalignment of the collimating lens 52 is prevented in a case in which the optical writing unit 4 vibrates and/or undesirable shock is applied thereto. More specifically, the collimating lens 52 is prevented from rotating in the main scanning direction (the direction of Y axis) and/or in the sub-scanning direction (the direction of Z axis). Accordingly, degradation of the scan light is prevented under shock or vibration.

With reference to FIGS. 21 through 24, a description is provided of the lens retainer according to a fourth illustrative embodiment of the present invention.

According to the fourth illustrative embodiment, a lens retainer 120C includes a pair of jig attachment portions to which a jig for pulling the end portions 125 away from each other is attached.

Figure 21:
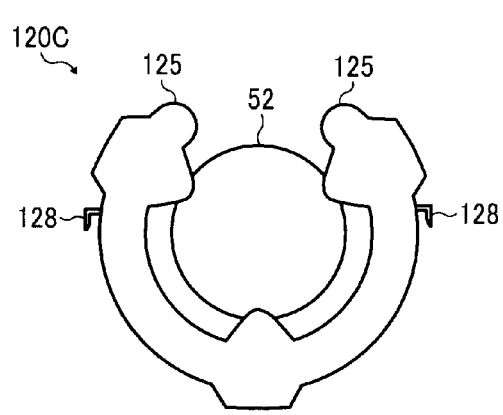
FIG. 21 is a schematic diagram illustrating the lens retainer including a pair of jig attachment portions projecting from a side surface of the lens retainer according to a fourth illustrative embodiment.
Figure 22:
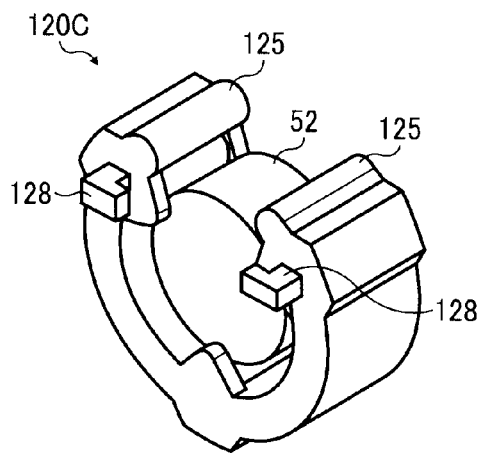
FIG. 22 is a perspective view schematically illustrating another example of the pair of jig attachment portions provided to the lens retainer.
Figure 23:
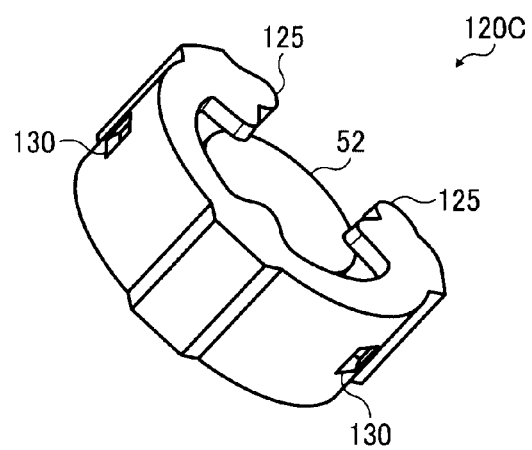
FIG. 23 is a perspective view schematically illustrating another example of the pair of jig attachment portions provided to the lens retainer.
Figure 24:
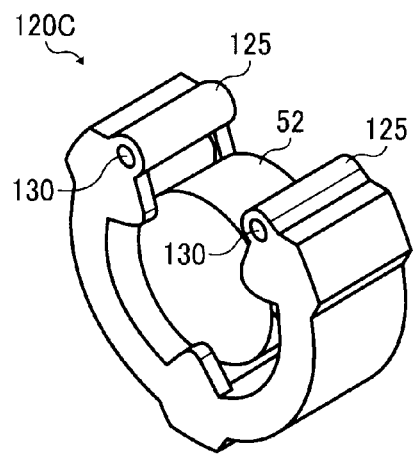
FIG. 24 is a perspective view schematically illustrating another example of the pair of jig attachment portions provided to the lens retainer.

FIG. 21 is a schematic diagram illustrating the lens retainer 120C including a pair of hook-like shaped jig attachment portions 128 projecting from the outer circumferential surface of the lens retainer 120C according to the fourth illustrative embodiment. FIG. 22 is a perspective view schematically illustrating the lens retainer 120C including the pair of jig attachment portions 128 projecting from the side surface of the lens retainer 120C. FIG. 23 is a perspective view illustrating the lens retainer 120C including another example of jig attachment portions, that is, jig attachment holes 130 formed in the outer circumferential surface of the lens retainer 120C. FIG. 24 is a perspective view illustrating the lens retainer 120C including another example of the jig attachment holes 130 formed in the side surface of the lens retainer 120C near the end portions 125.

As illustrated in FIGS. 21 and 22, in order to pull the end portions 125 away from each other, the tips of pliers such as needle-nose pliers are hooked on the hook-like shaped jig attachment portions 128 and then opened, thereby separating the end portions 125 away from each other with ease.

Alternatively, the end portions 125 are opened by inserting the tips of the needle-nose pliers into the holes 130 and then opening the tips of the pliers, thereby separating the end portions 125 away from each other with ease. Accordingly, the collimating lens 52 can be installed on the lens retainer 120 easily.

Figure 25:
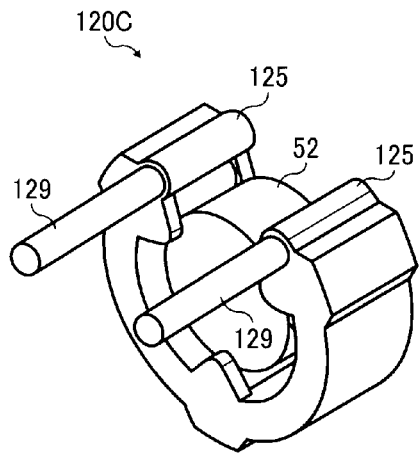
FIG. 25 is a perspective view schematically illustrating the lens retainer including a pair of handles.

Alternatively, as illustrated in FIG. 25, the lens retainer 120C may include at least one handle 129 that an operator can hold when the operator pulls the end portions 125 away from each other. The handle 129 extends from the side surface of the lens retainer 120C near the end portions 125. FIG. 25 is a perspective view schematically illustrating the lens retainer 120C including the handles 129.

With this configuration, the operator can pull the end portions 125 away from each other with ease, thereby facilitating installation of the collimating lens 52 on the lens retainer 120C.

Figure 26:
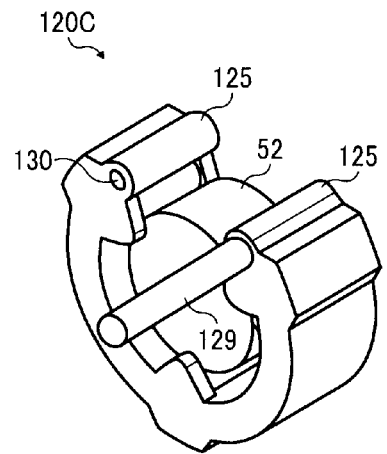
FIG. 26 is a perspective view schematically illustrating the lens retainer including one jig attachment portion and one handle of FIG. 25.

Alternatively, as illustrated in FIG. 26, one of the jig attachment holes 130 may be replaced by the handle 129. FIG. 26 is a perspective view schematically illustrating the lens retainer 120C including one jig attachment hole 130 and one handle 129. In this configuration, a pin of a fixation table is inserted into the jig attachment hole 130, and the operator holds the handle to pull the end portions 125 away from each other. Accordingly, the end portions 125 can be opened by the operator with ease, thereby facilitating installation of the collimating lens 52 on the lens retainer 120C. In terms of compactness, preferably, the lens retainer 120 may not include the handle 129.

Figure 27A:
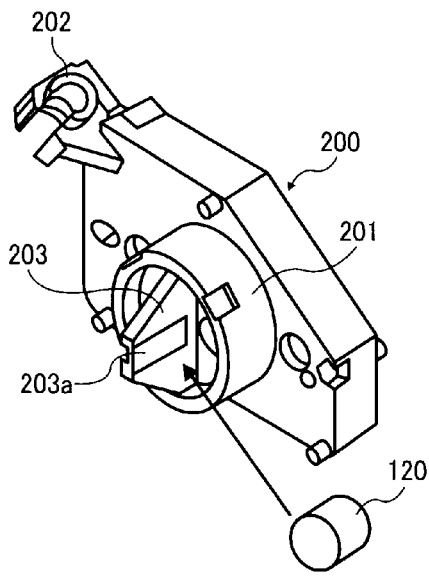
FIG. 27A is a schematic diagram illustrating an LD unit employed in the optical writing unit before the lens retainer is mounted.
Figure 27B:
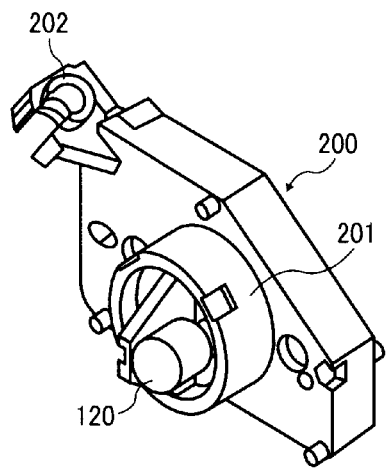
FIG. 27B is a schematic diagram illustrating the LD unit in a state in which the lens retainer is attached thereto.

With reference to FIGS. 27A and 27B, a description is provided of recycle of an LD unit 200 equipped with the laser diode 46 and the collimating lens 52. FIG. 27A is a schematic diagram illustrating the LD unit 200 before the lens retainer 120 is mounted. FIG. 27B is a schematic diagram illustrating the LD unit 200 in a state in which the lens retainer 120 is attached thereto.

As illustrated in FIG. 27A, the LD unit 200 includes a cylinder portion 201, an adjuster 202, and a separation wall 203 having a lens mounting portion 203a. The cylinder portion 201 is attached to the housing of the optical writing unit 4 by fitting into a through hole formed in a surface of the housing of the optical writing unit 4. The adjuster 202 adjusts an orientation of the LD unit 200 using an adjusting screw, not illustrated, attached to the adjuster 202.

As illustrated in FIG. 27A, the lens retainer 120 bearing the collimating lens 52 is fixed to the lens mounting portion 203a of the separation wall 203 that divides the cylinder portion 201 of the LD unit 200.

In a case in which the product life of the laser diode 46 reaches the end and the laser diode 46 is replaced, the positional relation between the laser diode 46 and the collimating lens 52 changes. Thus, the position of the collimating lens 52 needs to be adjusted again. In such a case, similar to the foregoing embodiments, the lens retainer 120 is separated from the lens mounting portion 203a, and the different attachment surface of the lens retainer 120 is positioned opposite the lens mounting portion 203a, and the position is adjusted. Subsequently, the lens retainer 120 is fixed to the lens mounting portion 203a using the adhesive agent. Accordingly, the LD unit 200 can be recycled.

In a case in which the LD unit 200 can no longer be used in an image forming apparatus due to a change in a specification or the like, the lens retainer 120 bearing the collimating lens 52 can be removed from the LD unit 200 and used in a different optical writing unit.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical writer, comprising:
a light source to project light against a target;
an optical part disposed on a light path between the light source and the target;
a housing to house the light source and the optical part; and
an elastically deformable retainer to hold the optical part, the retainer detachably fixed to the housing and including a plurality of contact portions on an inner surface of the retainer,
the retainer being configured to elastically deform to separate at least one of the contact portions from other contact portions to hold the optical part by the plurality of contact portions, wherein the retainer includes an incision in a direction of an optical axis with a space between opposed ends of the incision and holds the optical part along an outer circumferential surface of the retainer, and wherein the plurality of contact portions includes projections that contact the surface of the optical part extending parallel to the direction of the optical axis.

2. The optical writer according to claim 1, wherein the plurality of contact portions and the retainer are constituted as a single integrated member.

3. The optical writer according to claim 1, wherein the retainer includes a plurality of flanges, one of which is fixed to the housing.

4. The optical writer according to claim 3, wherein the housing includes a retainer mount, and a surface area of the flange to be fixed to the retainer mount is greater than a surface area of the retainer mount of the housing.

5. The optical writer according to claim 1, wherein the plurality of contact portions includes at least three contact portions.

6. The optical writer according to claim 1, wherein the retainer includes a positioning member that contacts a surface of the optical part perpendicular to the direction of optical axis to position the optical part in place in the direction of optical axis.

7. The optical writer according to claim 1, wherein the retainer includes a handle that an operator handles when the operator elastically deforms the retainer to install the optical part therein.

8. The optical writer according to claim 1, wherein the retainer includes a jig attachment portion to which a jig for elastically deforming the retainer is attached upon installation of the optical part in the retainer.

9. The optical writer according to claim 8, wherein the jig attachment portion comprises a hook that projects from a side surface of the retainer perpendicular to the direction of the optical axis, and the jig is attached to the hook.

10. The optical writer according to claim 8, wherein the jig attachment portion comprises a hole into which the jig is inserted.

11. The optical writer according to claim 1, wherein the retainer is made of material having high ultraviolet (UV) light transmissivity.

12. The optical writer according to claim 1, wherein the retainer has a substantially annular shape and holds the optical part on an inner circumferential surface of the retainer.

13. An image forming apparatus, comprising:
an image bearing member to bear a latent image on a surface thereof;
the optical writer of claim 1 to illuminate the surface of the image bearing member with light to form the latent image; and
a developing device to develop the latent image formed on the image bearing member using toner.

14. An optical writer, comprising:
a light source to project light against a target;
an optical part disposed on a light path between the light source and the target;
a housing to house the light source and the optical part; and
an elastically deformable retainer to hold the optical part, the retainer detachably fixed to the housing and including a plurality of contact portions on an inner surface of the retainer, the retainer being configured to elastically deform to separate at least one of the contact portions from other contact portions to hold the optical part by the plurality of contact portions, wherein the plurality of contact portions includes projections that contact the surface of the optical part extending parallel to the direction of the optical axis, and wherein the retainer has a substantially triangular shape with two slant surfaces elastically deformable upon installation of the optical part on an inner surface of the retainer.

15. An optical writer, comprising:
a light source to project light against a target;
an optical part disposed on a light path between the light source and the target;
a housing to house the light source and the optical part; and
an elastically deformable retainer to hold the optical part, the retainer detachably fixed to the housing and including a plurality of contact portions on an inner surface of the retainer, the retainer being configured to elastically deform to separate at least one of the contact portions from other contact portions to hold the optical part by the plurality of contact portions, wherein the retainer includes a positioning member that contacts a surface of the optical part perpendicular to the direction of optical axis to position the optical part in place in the direction of optical axis, and wherein the retainer includes a pressing member that presses a surface of the optical part against the positioning member, and the surface pressed by the pressing member is opposite the surface that the positioning member contacts, and wherein the plurality of contact portions includes projections that contact the surface of the optical part extending parallel to the direction of the optical axis.

16. The optical writer according to claim 15, wherein the pressing member comprises a spring.

* * * * *